June 22, 1965  J. A. MARLAND  3,190,556
RADIANT AND HOT AIR HEATING SYSTEM
Filed Sept. 10, 1963  3 Sheets-Sheet 2
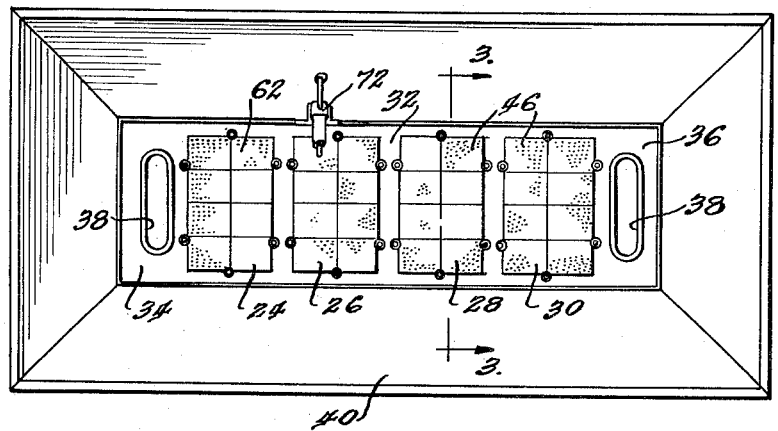
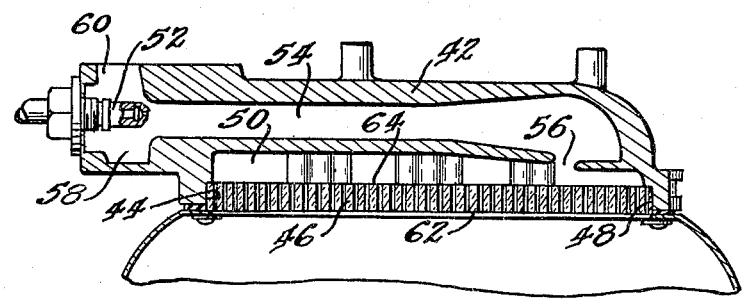
INVENTOR.
Joseph A. Marland
BY
Stone, Nierman,
Burmeister & Zummer
Attorneys

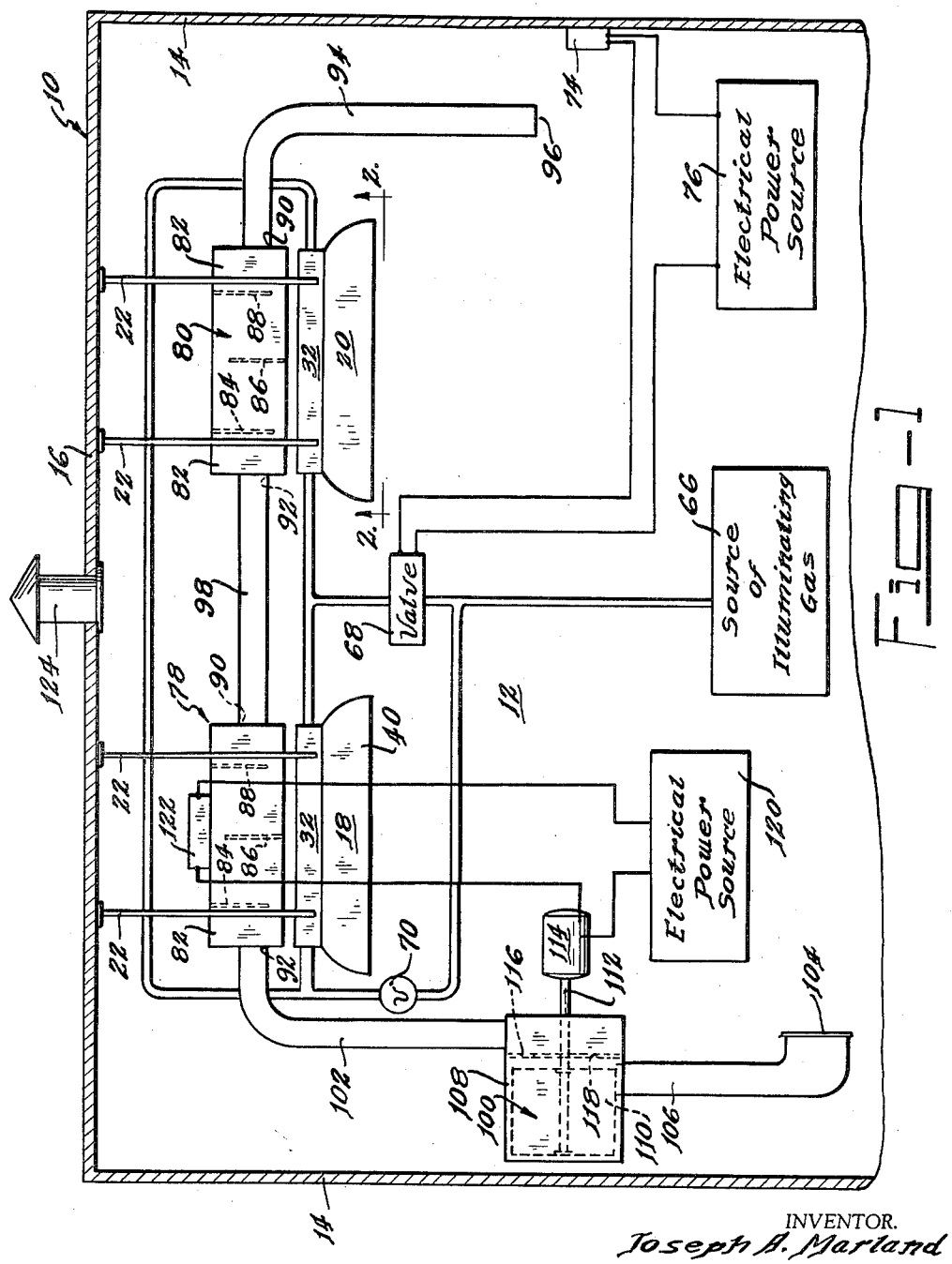

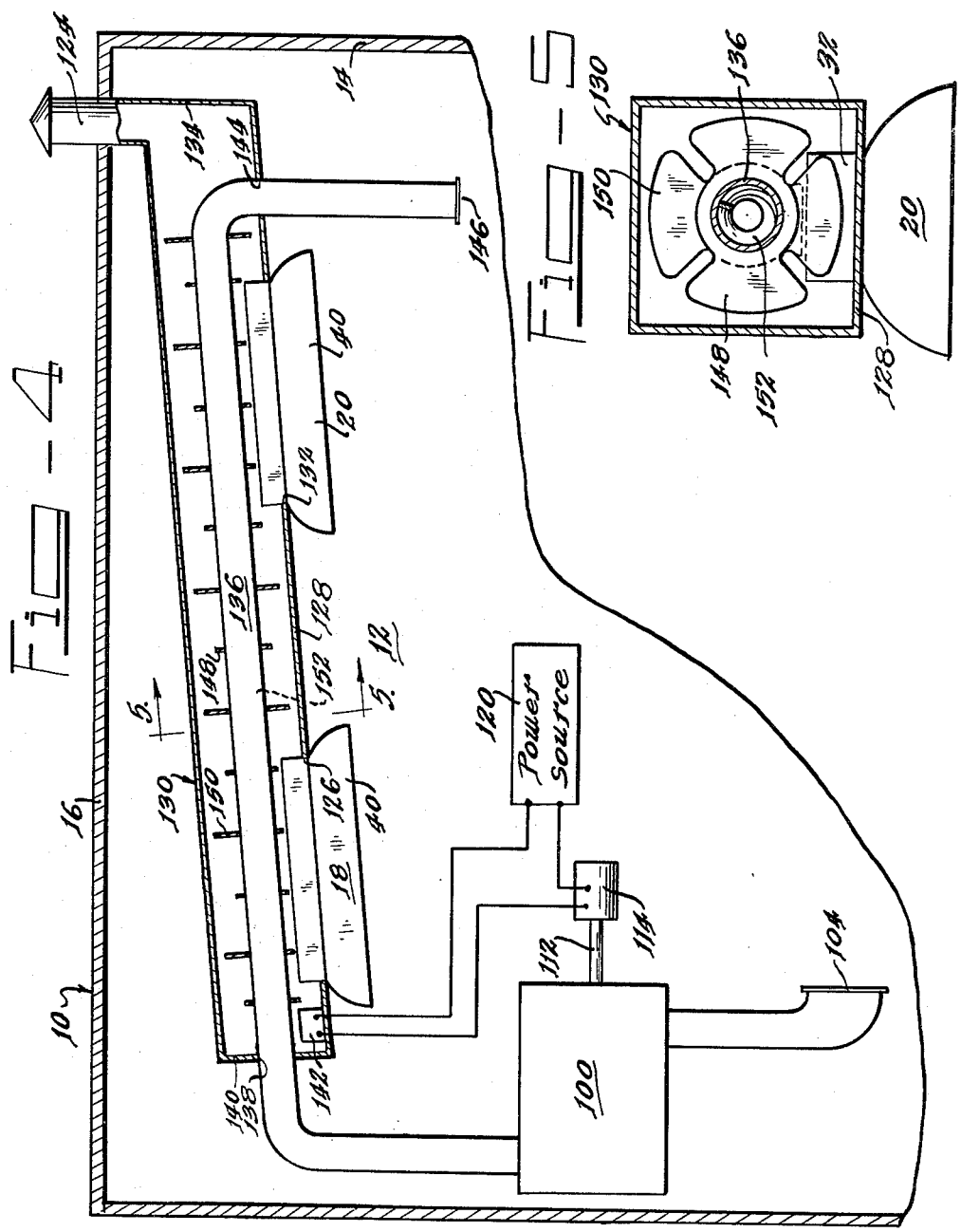

United States Patent Office 3,190,556
Patented June 22, 1965

3,190,556
RADIANT AND HOT AIR HEATING SYSTEM
Joseph A. Marland, La Grange, Ill., assignor to Marland Foundation, La Grange, Ill., a corporation of Illinois
Filed Sept. 10, 1963, Ser. No. 307,829
11 Claims. (Cl. 237—50)

The present invention relates to devices for heating enclosed areas. In particular, it relates to devices for heating objects disposed within an area to a higher temperature than can be achieved by mere space heating.

It is often desirable, particularly in factories, garages, mines, and other commercial establishments, to heat an object such as a work piece to a higher temperature than can be achieved by heating the ambient atmosphere to the temperature which is desired for the ambient atmosphere. Many factories, and other establishments, desire their workers to work in relatively cool surroundings, of the order of 60° Fahrenheit in order to promote efficiency, but desire the objects with which these workers are engaged to be at a warmer temperature in order to promote efficiency and skill. The most successful system of heating to achieve these ends utilizes radiant or infra-red heating units. With infra-red heating units, radiation from the units passes through the space between the units and the bodies which will absorb the infra-red radiation. In this manner, the space surrounding the work piece and other bodies is heated by contact with the bodies principally, rather than the reverse process of heating the ambient atmosphere first as in the case of conventional space heaters.

There are a number of types of infra-red generators or radiant heating systems. Infra-red radiation may be generated by infra-red electric bulbs, or by mere hot substances. One of the most suitable sources of infra-red radiation is a low temperature gas burner, such as disclosed in Patent No. 1,567,691 to Wiederhold, Patent No. 2,775,294 to Schwank, or Patent No. 3,044,538 to Honger. A suitable infra-red generator of this type has a housing with an opening which is closed by a porous ceramic plate. The housing forms a cavity adjacent to the plate, and a mixture of illuminating gas and air is introduced into this cavity at a desirable pressure to cause the gas to pass through the perforations of the ceramic plate and burn on the exterior surface of the plate. The ceramic plate permits the gas to burn at a temperature of approximately 1600° in a particular construction of an infra-red generator of this type while maintaining the temperature at the inside surface of the ceramic plate at a temperature of approximately 400° Fahrenheit. Since the temperature confronting the chamber is less than the ignition temperature of the illuminating gas, the illuminating gas will only burn adjacent to the exterior surface of the perforated plate, since it is ignited at that surface. The relatively cool temperature of the infra-red source, namely 1600° Fahrenheit, results in the generation of a relatively large percentage of infra-red energy, approximately 60 percent of the total energy produced by the generator, the remaining 40 percent being in the form of convected heat.

An infra-red energy source of this type produces a relatively large quantity of infra-red radiation for the fuel expended. It may be used to heat a work piece by radiation without heating the space surrounding the work piece to as high a temperature as would be required were the work piece to be heated by means of heating the space first, thus conserving the quantity of fuel expended. In addition, an infra-red generator of this type may be utilized without piping off exhaust gases of combustion. The gases from the infra-red generator merely rise to the upper portions of the structure in which the generator is utilized, and may be vented to the atmosphere by an open port, or the like.

Such units however have certain disadvantages. They fail to utilize the energy generated in the form of heat, and in the particular units described above, the heat energy constitutes approximately 40 percent of the total energy generated. In addition, it may be desirable to heat the space surrounding the work piece to a greater extent than can be achieved by a radiant heating method. Further, there is essentially no heat in portions of a structure which are out of the radiant field of the infra-red generator, since so little of the heat of the generator is converted into space heating. In addition, the exhaust gases and vapors from the burning illuminating gas rise to the upper portions of the structure in which the infra-red generator is utilized and condense on the cold surfaces of the structure. This condensate must be either avoided or removed, or it will drip down upon the work piece and contents of the structure.

It is an object of the present invention to provide a combination space and radiant heater utilizing an illuminating gas infra-red generator.

It is also an object of the present invention to provide an infra-red heating source utilizing illuminating gas which utilizes a larger percentage of the energy generated by the source than infra-red sources of this type have utilized heretofore.

Further, it is an object of the present invention to provide a radiant source of energy utilizing illuminating gas for heating an enclosed area with an improved means for avoiding the deleterious effects of condensate.

These and further objects of the present invention will be readily apparent from a further consideration of this disclosure, particularly when viewed in the light of the drawings, in which:

FIGURE 1 is a diagrammatic view of an enclosed area provided with a combination radiant and space heater constructed according to the teachings of the present invention;

FIGURE 2 is a view of one of the space heaters taken along the line 2—2 in FIGURE 1;

FIGURE 3 is a sectional view of one of the infra-red generators taken along the line 3—3 of FIGURE 2;

FIGURE 4 is a diagrammatic view of a further embodiment of the present invention illustrating a combination space and radiant heater disposed within an enclosed area; and FIGURE 5 is a sectional view taken along the line 5—5 of FIGURE 4.

In FIGURE 1, a building structure 10 is diagrammatically illustrated for the purpose of providing a confined area 12. The building structure 10 has walls 14 and a roof 16. Within the confined space 12 are two radiant heaters 18 and 20 which are each mounted on the roof 16 by brackets 22.

FIGURE 2 illustrates the construction of the radiant heaters 18 and 20 which are identical. Each of the radiant heaters has four infra-red generators 24, 26, 28, and 30, which are also identical in construction. The generators 24, 26, 28, and 30 are generally rectangular in shape and are mounted in a line with their longitudinal axes parallel to each other by a frame 32 which extends about the opposite edges of the generators. The frame 32 also mounts two covers 34 and 36 on opposite ends of the line of generators, and each of the covers is provided with a central orifice 38. A reflector 40 is also mounted on the frame 32 and depends therefrom. The reflector 40 may either have four flat sides generally in the form of a truncated pyramid, or may have parabolic surfaces for directing the radiant energy in the most desirable manner.

Each of the generators 24, 26, 28, and 30 is identical and is illustrated in FIGURE 3. Each generator has a cast iron housing 42 with a rectangular cross section and a generally rectangular opening 44 in its lower surface. A perforated ceramic plate 46 is mounted within the opening 44 of each housing 42, and a sealing strip 48 disposed about the perimeter of the plate 46 seals the perimeter of the plate 46 to the opening of the housing 42. The housing 42 also has a recess forming a cavity 50 confronting the plate 46 which is adapted to contain a mixture of illuminating gas and air.

Illuminating gas is injected into the housing in metered quantities through an orifice plug 52 which is connected to a source of illuminating gas, as will be described hereinafter, and which communicates with a mixer tube or venturi 54. The venturi 54 communicates with the cavity 50 through an opening 56. Also, air from the ambient atmosphere is aspirated through a chamber 58 disposed immediately adjacent to the orifice plug and communicating with the ambient atmosphere through an opening 60.

The orifice plug 52 permits the flow of illuminating gas at a proper pressure into the venturi 54 where it is mixed with air aspirated through the chamber 58 to achieve a proper mixture for burning. This mixture of air and illuminating gas is evenly distributed throughout the cavity 50 adjacent to the perforated ceramic plate 46. The mixture of illuminating gas and air seeps through the perforations of the plate 46 and is ignited to burn on the exterior surface of the plate, designated 62. Because of the relatively small quantity of gas present, the gas burns at a relatively low temperature, approximately 1600° Fahrenheit. Also, the interior surface of the perforated plate 46, designated 64 is maintained at a temperature of approximately 400° Fahrenheit, below the ignition temperature of the gas and air mixture. The relatively low temperature of the interior surface of the plate 46 is achieved through the combination of high thermal conductivity for the housing 42 and low thermal conductivity for the ceramic plate 46. As a result, approximately 60 percent of the energy produced by the generator is in the infra-red range, particularly in the range of 1.5 to 6.0 microns, and only approximately 40 percent of the generated energy is in the form of heat.

FIGURE 1 diagrammatically illustrates a source of illuminating gas 66, and the illuminating gas may be either manufactured gas, or natural gas in the form of propane, butane, or other gases which may be utilized in the manner of liquid petroleum gas. As illustrated in FIGURE 1, the gas source 66 is connected to the radiant heaters 18 and 20 through a valve 68 which is electrically actuated and a manual valve 70. The valve 68 is connected to the orifice plug 52 of each of the infra-red generators 24, 26, 28, and 30 of both of the radiant heaters 18 and 20. The valve 70 is connected to the pilot burners 72 of each of the radiant heaters 18 and 20, and the pilot burners 72 are adjusted to maintain a continuous flame so that the generators 24, 26, 28, and 30 of both radiant heaters 18 and 20 will immediately ignite upon passage of illuminating gas from the source 66 through the valve 68. The valve 68 is an electrically actuated valve, and it is connected through a thermostat 74 to a source of electrical power 76. The electrical power source may be a 110 volt alternating current line power source as is conventionally available, or a separate direct current source. The thermostat is mounted on one of the walls 14 of the building 10 near the floor of the building to sense the temperature of the space at that location in the building. When the temperature falls below a desired value, the thermostat connects the power source 76 in series with the electrical control means of the valve 68 to open the valve to the passage of illuminating gas from the source 66 and actuate the radiant heaters 18 and 20.

Immediately above the radiant heater 18 is a gas to gas heat exchanger 78, and immediately above the radiant heater 20 is a second gas to gas heat exchanger 80. The heat exchanger 78 is illustrated mounted on the straps 22 in common with the radiant heater 18, but it may equally well be mounted on separate straps and independently of the radiant heater 18. In like manner, the heat exchanger 80 is mounted on the same straps 22 as the radiant heater 20, but it likewise may equally well be mounted independently on the ceiling or other portions of the building from the radiant heater 20.

Each of the heat exchangers 78 and 80 is in the form of an elongated rectangular sheet metal box, designated 82. Within the box 82 are three parallel deflectors 84, 86, and 88 which extend vertically, the deflectors 84 and 88 from the top wall of the box 82, and the deflector 86 mid-way between the deflectors 84 and 88 from the bottom wall of the box 82. The box 82 has openings 90 and 92 at its opposite ends, and the openings 90 and 92 are utilized to connect the heat exchangers 78 and 80 in a circulation circuit. The opening 90 of the heat exchanger 80 connects to a depending tube 94 which has an opening 96 disposed below the level of the radiant heaters 18 and 20. The opening 96 is for the purpose of introducing air from the confined space 12 into the circulating system. The opening 92 of the heat exchanger 80 is interconnected with the opening 90 of the heat exchanger 78 by a tube 98, and the opening 92 of the heat exchanger 78 is connected to a fan assembly 100 by means of a tube 102. The fan assembly 100 is connected to a heat outlet register 104 through a tube 106. The fan assembly 100 has a cylindrical housing 108 which contains a squirrel cage fan 110 with a shaft 112 connected to an electric motor 114. The cylindrical housing 108 of the fan assembly has a partition 116 with a central aperture 118, and a portion of the housing 108 on the side of the partition 116 opposite the squirrel cage 110 is in communication with the tube 102. The portion of the housing on the side of the partition 116 of the squirrel cage 110 is in communication with the tube 106 and the register 104.

The electric motor 114 is connected to a second source of electrical power 120, although it is to be understood that the first source 76 could also be employed for this purpose. A thermostat 122 is mounted on the box 82 of the heat exchanger 78, and is electrically connected in series electrically with the motor 114 and the power source 120. The thermostat closes and completes this electrical circuit when it is subjected to a temperature above a threshold value, for example 100° Fahrenheit, thereby actuating the motor 114 and the fan assembly 100 to cause air to circulate from the opening 96 to the register 104 of the circulating system.

The combination space and radiant heating system illustrated in FIGURES 1 through 3 operates in the following manner. If it is assumed that the temperature of the confined space 12 is above the actuation temperature of the thermostat 74, the system remains dormant, except for the pilot 72 of the radiant heater 18 and radiant heater 20. When the temperature of the confined space 12 falls below the actuation temperature of the thermostat 74, the valve 68 is actuated to open position to pass gas from the source 66 to the infra-red generators 24, 26, 28, and 30 of the radiant heaters 18 and 20. The continually burning pilot 72 ignites gas passing through the perforated plates 46 to create burning on the exterior surface 62 of the perforated plates 46 of the infra-red generators, thereby producing both radiant energy and thermal energy. The radiant energy immediately traverses the air between the radiant heaters 18 and 20 to become absorbed in a confronting body and thereby liberating heat. The thermal energy generated by ignition of the gases at the exterior surface 62 of the plates 46 flows with the exhaust gases and vapors through the orifices 38 of the covers 34 which are mounted on the frame 32 of the radiant heaters 18 and 20 to rise upwardly toward the roof 16 of the building structure 10. As the gases rise, they contact the exterior surface of the box 82 and heat this surface. The box 82 is constructed of sheet metal, or other material of high thermal conductivity, thereby heating the volume of air disposed within the box 82. The gases and vapors of combustion continue to rise above the heat exchangers 78 and 80 and pass through a vent or port 124 in the roof 16 of the building structure 10 to the exterior.

As the temperature of the air within the boxes 82 of the heat exchangers 78 and 80 rises, this temperature exceeds the threshold value of the thermostat 122 actuating the thermostat. Actuation of the thermostat 122 closes the electrical circuit of the motor 114 and power source 120 to actuate the fan assembly 100. As a result, the fan assembly forces air out through the register 104 and creates a circulation of air through the heat exchangers 78 and 80 to produce space heating from the register 104. The register 104 is preferably disposed adjacent to the floor of the building structure 10, since warm air will rise therefrom.

It is to be understood that more than two heat exchangers may be utilized in practicing the present invention, and other types of gas to gas heat exchangers may also be utilized. Further, a single heat exchanger may also be utilized with a single radiant heater in order to utilize the thermal energy liberated in the process of producing radiant infra-red energy.

It is important that the opening 96 in the tube 94 be located below the level of the radiant heaters 18 and 20, since the exhaust gases and vapors from the combustion at the exterior surface of the perforated plates 46 of the infra-red generators would be circulated into the confined space 12 if the opening 96 were disposed above the level of the radiant heaters 18 and 20. It is to be noted that the embodiment of FIGURE 1 of the present invention minimizes the piping necessary for installing the combination space and radiant heater, since no piping is provided for venting the gases and vapors of combustion. As a result, the vapors of combustion may condense on the roof 16 of the building and cause dripping into the confined space unless adequate insulation is provided on the roof of the building to avoid condensation.

In the embodiment of FIGURES 4 and 5, the vapor and gaseous products of combustion are directly vented to the ambient external atmosphere to avoid contaminating the air in the confined space with any portion of these vapors and gases and to avoid condensation occurring on the roof of the building structure. In FIGURES 4 and 5, the building structure is designated by the same reference numerals as applied in FIGURE 1, since it may be identical and since the showing is diagrammatic. Further, two radiant heaters, identical to those shown in FIGURES 1 through 3 bear the same reference numerals 18 and 20 in the embodiment of FIGURE 4, and the control circuit for the illuminating gas supply to the radiant heaters 18 and 20 is identical to that shown in FIGURE 1 and has not been illustrated.

In the embodiments of FIGURES 4 and 5, the radiant heater 18 is mounted in a slot 126 in the wall 128 of a hollow casing 130, and the radiant heater 20 is mounted in an identical slot 132 in the wall 128 of the casing 130. The slots 126 and 130 have longitudinal axes parallel to the axis of elongation of the casing 130 and place the orifices 38 in the covers 34 of the radiant heaters 18 and 20 in communication with the interior of the casing 130. The casing 130 is inclined, and the upper end of the casing 130, designated 134, communicates with the vent 124 in the roof 16 of the building structure 10 to exhaust vapors and gases of combustion from the generators 24, 26, 28, and 30 from the building structure 10.

A cylindrical tube 136 extends along the central axis of the casing 130 and passes through a circular aperture 138 disposed in an end cover 140 at the end of the casing 130 opposite the end 134, or the lower end of the casing 130. The cylindrical tube 136 is connected with a fan assembly which may be identical with the fan assembly illustrated in FIGURE 1 and has been designated by the same reference numeral 100. The fan assembly 100 is also in communication with an exhaust port or register 104 in a manner identical to that illustrated in FIGURE 1. In like manner, the fan assembly is driven by an electric motor 114 and an electric power source 120, but the power source 120 and motor 114 are connected in series with a thermostat 142 disposed within the casing 130 adjacent to the end cover 140 at the lower end of the casing 130.

The tube 136 has a greater than right angle bend adjacent to the upper end 134 of the casing 130 and extends downwardly through an opening 144 in the wall 128 to a mouth 146 disposed below the level of the radiant heaters 18 and 20. The mouth 146 need not be disposed below the level of the radiant heaters 18 and 20, since the largest proportion of the vapor and gases of combustion are conducted through the casing 130 to the exterior of the building structure 10 and are not circulated within the confined space 12, but it is preferable to position the mouth 146 below the radiant heaters 18 and 20 to avoid circulation of these gases in the event of leaks or in the event of certain of the gases being blown beyond the edges of the reflectors 40 into the confined space.

As illustrated in FIGURE 5, the casing 130 has a rectangular cross section and the tube 136 has a circular cross section. The tube 136 also is provided with two courses of fins 148 and 150. The fins 148 extend from the sides of the tube 136 in a horizontal plane and the fins 150 extend from the sides of the tube in a vertical plane. The fins 148 and 150 and the tube 136 are constructed of material of high thermal conductivity, such as sheet metal, but it is not necessary for the casing 130 to be constructed of material of high thermal conductivity. It is the purpose of the fins 148 and 150 to transfer as much heat as possible from the region within the casing between the tube and the casing to the air within the tube 136. In like manner, the interior of the tube may be provided with air deflecting surfaces, such as a spiral member 152.

The embodiment of the present invention illustrated in FIGURES 4 and 5 operates in the following manner. The temperature responsive control system for the radiant heaters 18 and 20, that is, the thermostat controlled system operated by the temperature of the confined space, supplies gas to the radiant heaters 18 and 20, in the manner described in the relation to the embodiment of FIGURES 1 through 3. Thereafter, combustion on the exterior surface 62 of the perforated plates 46 of the generators 24, 26, 28, and 30 occurs, and the exhaust gases and vapors pass through the orifices 38 in the covers 34 of the radiant heaters 18 and 20 to enter the casing 130. Since the casing 130 is inclined, these relatively hot vapors and gases travel up the casing 130 to the vent 124 in the roof 16 of the building structure 10. However, the heat from the gases and vapors of combustion is transmitted to the tube 136 by contact with the tube 136 and by contact with the fins 148 and 150. The rate at which the vapors and gases of combustion rise is retarded by means of the fins 148 and 150 in order to transfer as much heat as possible to the tube 136. When the temperature within the casing rises to the threshold value of the thermostat 142, the electric motor 114 is actuated, thereby driving the fan assembly 100. The fan assembly 100 forces the air from the confined space 12 to flow into the mouth 146 of the tube 136 and through the casing 130. The heated air thereupon is ejected from the opening or register 104 into the confined space 12. The spiral deflector 152 within the tube 136 assures mixing of the air passing through the tube 136 and also transmits heat from the surface of the tube 136 to the air passing through the tube 136.

It is also to be noted that the casing 130 may be horizontal, or at a disadvantageous incline, if a means is provided to force the gases and vapors along the casing 130 and out of the port 124.

It is to be understood that one or more radiant heating units 18 may be employed in accordance with the present invention. Further, those skilled in the art will readily devise many applications for the present invention beyond that here illustrated and modifications of the structure here set forth within the intended scope of the present invention. It is therefore intended that the scope of this invention be not limited by the foregoing disclosure, but rather only by the appended claims.

The invention claimed is:

1. A combination radiant and hot air heating system comprising an infra-red generator having a porous plate disposed downwardly mounted and sealed on a housing, said housing having a cavity on one side of the plate, valve means for introducing illuminating gas into the cavity and maintaining the cavity at a gas pressure sufficient to force gas through the plate to permit the gas to burn on the opposite side of the porous plate at a relatively low temperature to produce substantial infra-red radiation, and an air impermeable circulating system having an inlet at one end disposed below the level of the porous plate and an outlet at the other end, said circulating system including a gas to gas heat exchanger in thermal communication with the exhaust gases and vapors generated at the side of the porous plate opposite the cavity and having an air tight passage disposed in the circulation system, whereby an object may be placed below the infra-red generator and in the radiation field of the infra-red generator and the outlet of the circulation system directed toward the space surrounding the object to heat the object by infra-red radiation and the surrounded space by a flow of heated air.

2. A combination radiant and hot air heating system comprising a frame, a plurality of infra-red generators mounted on the frame, each generator having a housing constructed of non-flammable material and having a high thermal conductivity, said housing having a cavity therein and a porous plate of material of low thermal conductivity disposed on one side of the cavity, the porous plates of the generators being disposed in a common plane, a gas impermeable hood mounted on the frame and extending from the side of the plane of the porous plates opposite the housings of the generators, said frame having an opening therein for combustion gases and vapors to pass through from the side of the plane of the porous plates opposite the housings of the infra-red generators, and an air impermeable circulating system having an inlet at one end for receiving air to be heated and an outlet at the other end, said circulating system having a gas to gas heat exchanger confronting the opening in the frame with a passage in series with the circulating system disposed adjacent to the frame on the side of the plane of the perforated plates of the generators opposite the hood.

3. A combination radiant and hot air heating system comprising the elements of claim 2 wherein the gas to gas heat exchanger comprises an elongated box of thermal conducting material, the exterior surfaces of the box being in the path of the gases and vapors of combustion, said box having openings at opposite ends communicating with the circulating system and a plurality of baffles therein.

4. A combination radiant and hot air heating system comprising the elements of claim 2 wherein the heat exchanger comprises an elongated casing adapted to be disposed at an incline to the horizontal and having openings at opposite ends thereof, an elongated tube of material of high thermal conductivity extending through the casing and sealed within the openings at the ends of the casing, the ends of said tube exterior of the casing communicating with the circulating system, said casing having a slot at the end adapted to be the lower end thereof, the opening of the frame being in communication with the slot and isolated from the atmosphere, and said casing having an aperture at the end adapted to be the higher end thereof adapted to be connected to an exhaust port.

5. A heating system for a building having walls enclosing the space to be heated and a port near the highest portion of the building communicating with the ambient atmosphere comprising, an infra-red generator having a housing and a porous plate mounted and sealed on the housing, said housing having a cavity on one side of the plate, means for mounting the infra-red generator within the building above the surface of the floor of the building with the porous plate generally horizontal, valve means for introducing illuminating gas into the cavity of the infra-red generator and maintaining the cavity at a gas pressure sufficient to force gas through the plate to permit the gas to burn on the lower side of the porous plate at a relatively low temperature to produce substantial infra-red radiation, and an air impermeable circulating system having an inlet at one end disposed below the level of the porous plate and an outlet at the other end adjacent to the floor, said circulating system including a gas to gas heat exchanger mounted directly above the infra-red generator and in thermal communication with the exhaust gases and vapors generated at the lower side of the porous plate, said heat exchanger having an air tight passage disposed in the circulation system, whereby the floor of the building and the objects on the floor of the building will be heated by infra-red energy and the space within the building will be heated by the warm air coming from the outlet end of the circulating system adjacent to the floor, and the vapors and gases of combustion will exit to the ambient atmosphere through the port.

6. A heating system for a building having walls and a floor enclosing the space within the building to be heated and a port near the highest portion of the space within the building to be heated communicating with the ambient atmosphere comprising the elements of claim 2 wherein the gas to gas heat exchanger comprises an elongated casing disposed at an acute angle to the horizontal and having openings at opposite ends thereof, an elongated tube of material of high thermal conductivity extending through the casing and openings at the ends of the casing, the higher end of the tube communicating with the ambient atmosphere and forming an inlet for the circulating system and the lower end of the tube communicating with the outlet portion of the circulating system, said casing having a slot therein adjacent to the lower end thereof, the opening of the frame being sealed within the slot of the casing to permit gases and vapors of combustion to enter the casing, and said casing having an aperture at the higher end thereof connected to the port of the building through an air impermeable tube.

7. A heating system for a building having walls and a floor enclosing the space within the building to be heated and a port near the highest portion of the space communicating with the ambient atmosphere comprising the elements of claim 6 wherein the circulating system comprises a fan assembly mounted between the lower end of the tube and the outlet end of the circulating system, said fan assembly having an electric motor, and a temperature sensitive control system for the electric motor including a thermostat mounted in thermal relationship with the air within the casing.

8. A heating system for a building having walls and a floor enclosing the space within the building to be heated and at a port adjacent to the highest portion of the space to be heated communicating with the ambient atmosphere comprising the elements of claim 5 wherein the circulating system includes a fan assembly connected in series therewith, said fan assembly having an electric motor for providing rotational power thereto, and a control system for the electric motor including a thermostat in thermal contact with the air within the gas to gas heat exchanger.

9. A combination radiant and hot air heating system comprising: an air impermeable circulating system having an inlet at one end for receiving air to be heated and an outlet at the other end, said circulating system having a plurality of gas to gas heat exchangers therein, each heat exchanger having a passage in series with the circulating system and isolated from the ambient atmosphere; a radiant heater disposed below and in thermal contact with each of the gas to gas heat exchangers, each radiant heater having a frame, a plurality of infra-red generators mounted on the frame, each generator having a housing constructed of non-flammable material and having a high thermal conductivity, said housing having a cavity therein and a porous plate of material of low thermal conductivity disposed on the lower side of the cavity, the porous plates of the generators of each infra-red heater being disposed in a common plane below the gas to gas heat exchanger associated therewith, a gas impermeable hood mounted on the frame and extending downwardly therefrom, said frame having an opening therein for combustion gases and vapors to pass through from the lower side of the frame.

10. A heating system for a building having walls and a floor enclosing the space within the building to be heated and a port communicating with the ambient atmosphere comprising the elements of claim 9 wherein the port is in communication with the exhaust gases and vapors and the circulating system is provided with air impelling means including an electrical motor, in combination with temperature responsive means including a thermostat mounted adjacent to a heat exchanger for actuating the motor, and temperature responsive means for interrupting the flow of illuminating gas to the cavities of the generators responsive to the temperature of the space exceeding a threshold value.

11. A heating system for a building having walls and a floor enclosing a space within the building to be heated and a port near the highest portion of the space within the building communicating with the ambient atmosphere comprising an elongated casing disposed within the building at an acute angle to the horizontal and having openings at the opposite ends thereof, an elongated tube of material of high thermal conductivity extending through the casing and openings at the ends of the casing, the higher end of the tube communicating with the atmosphere within the space to be heated and forming an inlet for a circulation system and the lower end of the tube communicating with the outlet portion of the said circulating system, said casing having a plurality of slots disposed therein on the lower side thereof, a radiant heater mounted in each of the slots, each radiant heater having a frame, a plurality of infra-red generators mounted within the frame, each generator having a housing constructed of non-flammable material and having a high thermal conductivity, said housing having a cavity therein and a porous plate of material of low conductivity disposed on one side of the cavity, the porous plates of the generators being disposed in a common plane confronting the space to be heated, a gas impermeable hood mounted on the frame and extending from the side of the plane of the porous plates toward the space to be heated, said frame having an opening therein for combustion gases and vapors to pass through from the side of the frame into the casing, and air impermeable means for connecting the other ends of the casing to the port of the building.

References Cited by the Examiner

UNITED STATES PATENTS 1,639,114   8/27   Smith _____ 126—91
1,945,379   1/34   Roesch _____ 126—110

FOREIGN PATENTS 763,402   12/56   Great Britain.

EDWARD J. MICHAEL, *Primary Examiner.*